United States Patent
Kim et al.

(10) Patent No.: US 11,742,541 B2
(45) Date of Patent: Aug. 29, 2023

(54) SECONDARY BATTERY

(71) Applicant: LG Chem, Ltd., Seoul (KR)

(72) Inventors: Ki Youn Kim, Daejeon (KR); Jee Ho Kim, Daejeon (KR); Myung Hoon Ko, Daejeon (KR); Jung Il Park, Daejeon (KR); Yong Tae Lee, Daejeon (KR); Gyung Soo Kang, Daejeon (KR)

(73) Assignee: LG Energy Solution, Ltd.

( * ) Notice: Subject to any disclaimer, the term of this patent is extended or adjusted under 35 U.S.C. 154(b) by 205 days.

(21) Appl. No.: 17/281,792

(22) PCT Filed: Oct. 1, 2019

(86) PCT No.: PCT/KR2019/012792
§ 371 (c)(1),
(2) Date: Mar. 31, 2021

(87) PCT Pub. No.: WO2020/071719
PCT Pub. Date: Apr. 9, 2020

(65) Prior Publication Data
US 2021/0391615 A1 Dec. 16, 2021

(30) Foreign Application Priority Data
Oct. 5, 2018 (KR) .......... 10-2018-0118868

(51) Int. Cl.
*H01M 50/107* (2021.01)
*H01M 50/548* (2021.01)
(Continued)

(52) U.S. Cl.
CPC ..... *H01M 50/107* (2021.01); *H01M 10/0422* (2013.01); *H01M 10/0431* (2013.01);
(Continued)

(58) Field of Classification Search
CPC ............. H01M 50/107; H01M 50/548; H01M 50/545; H01M 50/119; H01M 50/193;
(Continued)

(56) References Cited

U.S. PATENT DOCUMENTS

2007/0190407 A1* 8/2007 Fujikawa ............ H01M 10/052
429/174
2009/0181297 A1 7/2009 Ashizaki et al.
(Continued)

FOREIGN PATENT DOCUMENTS

CN 103262288 A 8/2013
CN 206921926 U 1/2018
(Continued)

OTHER PUBLICATIONS

Search Report dated Aug. 1, 2022 from the Office Action for Chinese Application No. 201980063962.2 dated Aug. 8, 2022, pp. 1-3.
(Continued)

*Primary Examiner* — Jane J Rhee
(74) *Attorney, Agent, or Firm* — Lerner David LLP

(57) ABSTRACT

A secondary battery according to the present invention comprises: an electrode assembly in which a first electrode, a separator, and a second electrode are alternately stacked and wound together; a can provided with an accommodation part that accommodates the electrode assembly therein, the can comprising a first can and a second can, which have cylindrical shapes opened in a direction facing each other; and an insulator configured to insulate an overlapping portion between the first can and the second can. The first can forms a first electrode terminal that directly contacts an end of the first electrode, and the second can forms a second electrode terminal that directly contacts an end of the second electrode.

18 Claims, 7 Drawing Sheets

(51) Int. Cl.
*H01M 50/545* (2021.01)
*H01M 50/119* (2021.01)
*H01M 50/193* (2021.01)
*H01M 10/04* (2006.01)
*H01M 10/0587* (2010.01)
*H01M 50/10* (2021.01)

(52) U.S. Cl.
CPC ....... *H01M 10/0587* (2013.01); *H01M 50/10* (2021.01); *H01M 50/119* (2021.01); *H01M 50/193* (2021.01); *H01M 50/545* (2021.01); *H01M 50/548* (2021.01)

(58) Field of Classification Search
CPC ............. H01M 50/10; H01M 10/0422; H01M 10/0431; H01M 10/0587
See application file for complete search history.

(56) References Cited

U.S. PATENT DOCUMENTS

| | | |
|---|---|---|
| 2009/0305114 A1 | 12/2009 | Yeo |
| 2010/0159289 A1 | 6/2010 | Kim et al. |
| 2011/0091753 A1 | 4/2011 | Wang et al. |
| 2012/0003506 A1 | 1/2012 | Shin |
| 2013/0130066 A1 | 5/2013 | Pytlik et al. |
| 2015/0044525 A1 | 2/2015 | Jourdren et al. |
| 2015/0147616 A1 | 5/2015 | Chemelewski et al. |
| 2015/0221925 A1 | 8/2015 | Kim et al. |
| 2016/0126584 A1 | 5/2016 | Lee et al. |
| 2016/0141561 A1 | 5/2016 | Watanabe et al. |
| 2021/0391615 A1 | 12/2021 | Kim et al. |

FOREIGN PATENT DOCUMENTS

| | | |
|---|---|---|
| CN | 112771709 A | 5/2021 |
| JP | 2005276814 A | 10/2005 |
| JP | 2011171014 A | 9/2011 |
| JP | 2016100122 A | 5/2016 |
| KR | 200350687 Y1 | 5/2004 |
| KR | 20040079866 A | 9/2004 |
| KR | 20090127701 A | 12/2009 |
| KR | 20100073761 A | 7/2010 |
| KR | 101373218 B1 | 3/2014 |
| KR | 20140146128 A | 12/2014 |
| KR | 20150076382 A | 7/2015 |
| KR | 20160010121 A | 1/2016 |
| KR | 20170082019 A | 7/2017 |

OTHER PUBLICATIONS

Extended European Search Report for EP19868707.1 dated Oct. 6, 2021, 2 pgs.
International Search Report dated Jan. 13, 2020 for Application No. PCT/KR2019/012792, 3 pages.

* cited by examiner (a)　　　　　(b)

SECONDARY BATTERY

CROSS-REFERENCE TO RELATED APPLICATIONS

The present application is a national phase entry under 35 U.S.C. § 371 of International Application No. PCT/KR2019/012792 filed Oct. 1, 2019, which claims priority from Korean Patent Application No. 10-2018-0118868, filed on Oct. 5, 2018, which is hereby incorporated by reference in its entirety.

TECHNICAL FIELD

The present invention relates to a secondary battery.

BACKGROUND ART

Secondary batteries are rechargeable, unlike primarily batteries, and also they are very capable of compact size and high capacity. Thus, recently, many studies on secondary batteries have been carried out. As technology development and demands for mobile devices increase, the demands for secondary batteries as energy sources are rapidly increasing.

Secondary batteries are classified into coin type cells, cylindrical type cells, prismatic type cells, and pouch type cells according to a shape of a battery case. In such a secondary battery, an electrode assembly mounted in a battery case is a chargeable and dischargeable power generating device having a structure in which an electrode and a separator are stacked.

The electrode assembly may be generally classified into a jelly-roll type electrode assembly, a stacked type electrode assembly, and a stack-folding type electrode assembly. In a jelly-roll type electrode assembly, a separator is interposed between a positive electrode and a negative electrode, each of which is provided as the form of a sheet coated with an active material, and then, the positive electrode, the separator, and the negative electrode are wound. In a stacked type electrode assembly, a plurality of positive and negative electrodes with a separator therebetween are sequentially stacked. In a stack/folding type electrode assembly, stacked type unit cells are wound together with a separation film having a long length. Among them, the jelly-roll type electrode assembly is widely used because the jelly-roll type electrode assembly has advantages in ease of manufacturing and high energy density per weight.

DISCLOSURE OF THE INVENTION

Technical Problem

One aspect of the prevent invention is to provide a secondary battery that is capable of reducing the number of manufacturing processes and providing reliability such as sealability.

Another aspect of the prevent invention is to provide a secondary battery that is disconnected between a can and an electrode assembly when an internal pressure of the battery reaches a critical point or higher.

Technical Solution

A secondary battery according to an embodiment of the present invention comprises an electrode assembly in which a first electrode, a separator, and a second electrode are alternately stacked to be wound, a can provided with an accommodation part that accommodates the electrode assembly therein, the can comprising a first can and a second can, which have cylindrical shapes opened in a direction facing each other, and an insulator configured to insulate an overlapping portion between the first can and the second can, wherein the first can forms a first electrode terminal that directly contacts an end of the first electrode, and the second can forms a second electrode terminal that directly contacts an end of the second electrode.

Advantageous Effects

According to the present invention, since the two cans are assembled in the press-fitting manner to allow each of the positive electrode and the negative electrode to be connected, the two cans may serve as the positive electrode terminal and the negative electrode terminal to simplify the manufacturing process, provide reliability such as the sealability, and ease manufacturing of large-capacity medium and large batteries. Therefore, high productivity and low manufacturing costs may be realized.

In addition, according to the present invention, when the internal pressure of the battery reaches the critical point or higher, the coupling of the two cans that are press-fitted into and coupled to each other may be released, and the electrode assembly coupled to the two cans may be disconnected. Therefore, when the internal temperature and pressure of the battery suddenly increase due to the overcharging and the external short-circuit of the secondary battery, the coupling of the two cans that are press-fitted into and coupled to each other may be released to perform a safety function such as the current interruption function without an additional safety device.

MODE FOR CARRYING OUT THE INVENTION

Figure 1:
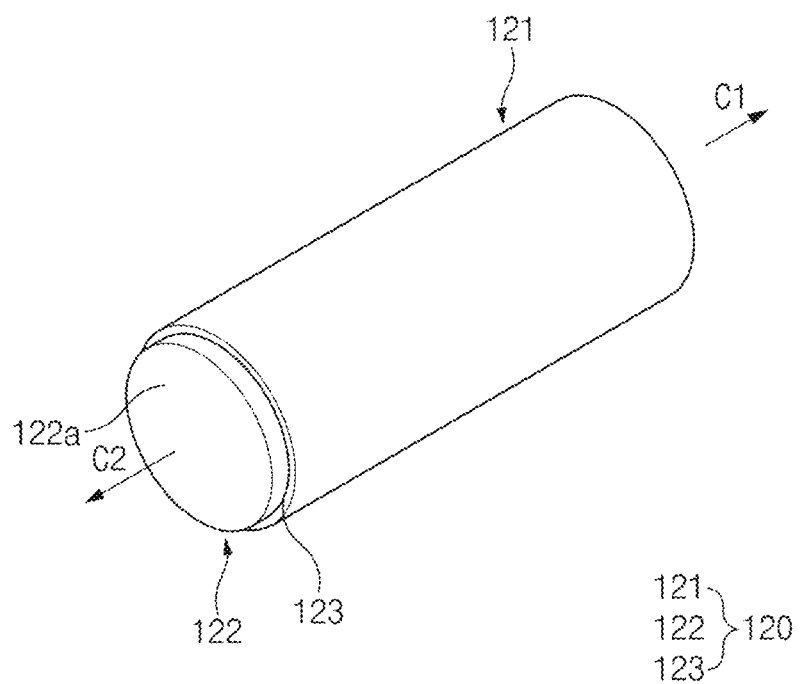
FIG. 1 is a perspective view of a secondary battery according to a first embodiment of the present invention.

The objectives, specific advantages, and novel features of the present invention will become more apparent from the following detailed description taken in conjunction with the accompanying drawings. It should be noted that the reference numerals are added to the components of the drawings in the present specification with consistent numerals as much as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
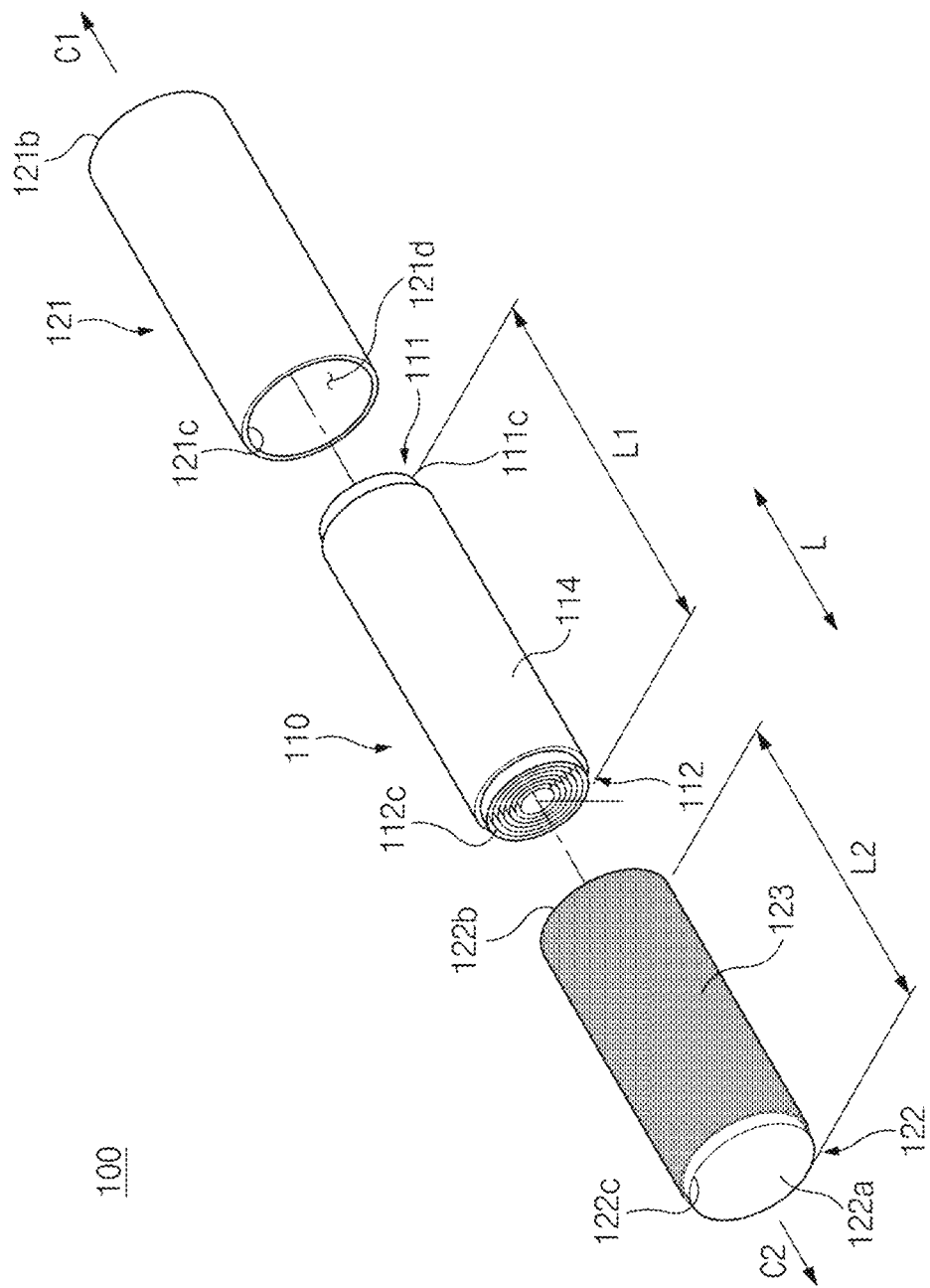
FIG. 2 is an exploded perspective view of the secondary battery according to the first embodiment of the present invention.

FIG. 1 is a perspective view of a secondary battery according to a first embodiment of the present invention, and FIG. 2 is an exploded perspective view of the secondary battery according to the first embodiment of the present invention.

Figure 3:
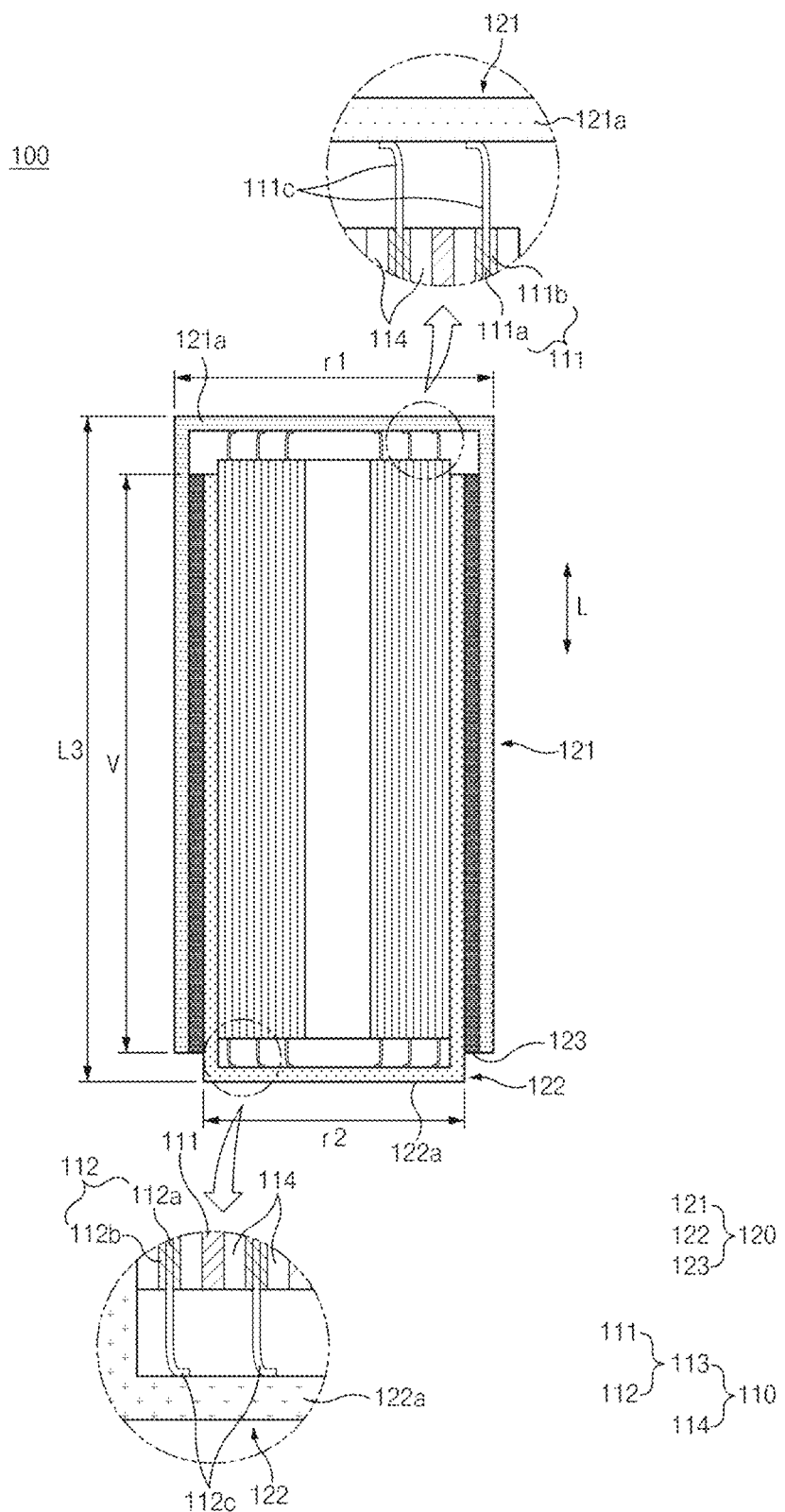
FIG. 3 is a cross-sectional view of the secondary battery according to the first embodiment of the present invention.

Referring to FIGS. 1 to 3, a secondary battery 100 according to an embodiment of the present invention comprises an electrode assembly 110, a can 120 comprising a first can 121 and a second can 122, which accommodate the electrode assembly 110 therein, and an insulator 123 insulating an overlapping portion between the first can 121 and the second can 122.

FIG. 3 is a cross-sectional view of the secondary battery according to the first embodiment of the present invention.

Hereinafter, the secondary battery according to an embodiment of the present invention will be described in more detail with reference to FIGS. 1 to 3.

Referring to FIGS. 2 and 3, the electrode assembly 110 may be a chargeable and dischargeable power generation element and have a structure in which an electrode 113 and a separator 114 are combined to be alternately stacked with each other. Here, the electrode assembly 110 may have a wound shape.

The electrode 113 may comprise a first electrode 111 and a second electrode 112. Also, the separator 114 may separate the first electrode 111 from the second electrode 112 to insulate the first and second electrodes 111 and 112 from each other. Here, each of the first electrode 111 and the second electrode may be provided in the form of a sheet and then be wound together with the separator 114 so as to be formed in a jelly roll type. Here, the electrode assembly 110 may be wound, for example, in a cylindrical shape.

The first electrode 111 may comprise a first electrode collector 111*a* and a first electrode active material 111*b* applied on the first electrode collector 111*a*. Also, the first electrode 111 may comprises a first electrode non-coating portion 111*c* that is not coated with the first electrode active material 111*b*.

Here, the first electrode 111 may be provided as, for example, a positive electrode and comprise a positive electrode collector (not shown) and a positive electrode active material (not shown) applied on the positive electrode collector. Also, a positive electrode non-coating portion that is not coated with the positive electrode active material may be formed on the first electrode 111.

For example, the positive electrode collector may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

The second electrode 112 may comprise a second electrode collector 112*a* and a second electrode active material 112*b* applied on the second electrode collector 112*a*. Also, the second electrode 112 may comprise a second electrode non-coating portion 112*c* that is not coated with the second electrode active material 112*b*.

Here, the second electrode 112 may be provided as, for example, a negative electrode and comprise a negative electrode collector (not shown) and a negative electrode active material (not shown) applied on the negative electrode collector. Also, a negative electrode non-coating portion that is not coated with the negative electrode active material may be formed on the second electrode 112.

For example, the negative electrode collector may be provided as foil made of a copper (Cu) or nickel (Ni) material. The negative electrode active material may comprise synthetic graphite, lithium a metal, a lithium alloy, carbon, petroleum coke, activated carbon, graphite, a silicon compound, a tin compound, a titanium compound, or an alloy thereof. Here, the negative electrode active material may further comprise, for example, non-graphite-based $SiO_2$ (silica) or SiC (silicon carbide).

The separator 114 may be made of an insulating material, and the first electrode 111, the separator 114, and the second electrode 112 may be alternately stacked. Here, the separator 114 may be disposed between the first electrode 111 and the second electrode on outer surfaces of the first electrode 111 and the second electrode 112. Here, the separator 114 may be disposed at the outermost side in a width direction when the electrode assembly 110 is wound.

Also, the separator 114 may be made of a flexible material. Here, the separator 114 may be made of, for example, a polyolefin-based resin film such as polyethylene or polypropylene having micropores.

The can 120 may be provided with an accommodation part that accommodates the electrode assembly 110 therein and comprises a first can 121 and a second can 122, which have cylindrical shapes opened in a direction facing each other.

Here, the first can 121 may be electrically connected to the first electrode 111, and the second can 122 may be electrically connected to the second electrode 112. The first can 121 may directly contact an end of the first electrode 111 to form a first electrode terminal, and the second can 122 may directly contact an end of the second electrode 112 to form a second electrode terminal.

Also, the first can 121 and the second can 122 may be formed in shape corresponding to each other.

Also, each of the first can 121 and the second can 122 may have the cylindrical shape. The first can 121 may have an inner circumferential surface greater than an outer circumferential surface of the second can 122 so that the second can is inserted into the first can 121.

Furthermore, the first can 121 may have a first side 121*b* on which a first connection part 121*a* may be formed to be closed in a first direction C1, and the first can 121 may have a second side 121*c* in which a first opening 121*d* is formed to be opened in a second direction C2 opposite the first direction C1. The second can 122 may have a second side 122*c* on which a second connection part 122*a* is formed to be closed in the second direction C2, and the second can 122 may have a first side 122*b* in which a second opening (not shown) is formed to be opened in the first direction C1. Here, the first electrode 111 may have one end connected to the first connection part 121*a*, and the second electrode 112 may have the other end connected to the second connection part 122*a*. Here, for example, the first electrode non-coating portion 111*c* of the first electrode 111 may directly contact the first connection part 121*a*, and the second electrode non-coating portion 112*c* of the second electrode 112 may directly contact the second connection portion 122*a*.

For example, the first can 121 disposed at the outside may comprise aluminum (Al), and the second can 122 disposed at the inside may comprise steel. Here, the connection can 122 may be made of steel coated with nickel (Ni).

Here, the first electrode 111 may be provided as a positive electrode, and the second electrode 112 may be provided as a negative electrode.

A length L1 of the electrode assembly 110 in a longitudinal direction L may be greater than a length L2 of the second can 122 in the longitudinal direction L. Thus, an end of the second can 122 may not contact the first connection part 121a. Thus, it may be unnecessary that the insulator 123 surrounds an end of the second can 122 so as to easily prevent short circuit from occurring and prevent the end of the second can 122 from contacting the first connection part 121a.

A length V of an overlapping section between the first can 121 and the second can 122 is longer than a diameter r1 of the first can 121 and a diameter r2 of the second can 122. Thus, reliability such as sealability may be secured.

For example, the length of the first can 121 may be 70% or more of the length of the second can 122. Specifically, for example, the length of the overlapping section between the first can 121 and the second can 122 may be 70% or more and less than 100% of the total length of the can 120.

More specifically, for example, each of the lengths L2 of the first can 121 and the second can 122 in the longitudinal direction L may be in a range of 100 mm to 250 mm. A length L3 of the can 120 along which the first can 121 and the second can 122 are coupled may also be in a range of 100 mm to 250 mm. Also, each of the diameters r1 and r2 of the first can 121 and the second can 122 may be in a range of 40 mm to 60 mm. When satisfying the above-described ranges, heat may be effectively dissipated, and the reliability such as the sealability may be secured.

The insulator 123 may comprise an insulating material to insulate the overlapping portion between the first can 121 and the second can 122.

Furthermore, the insulator 123 may comprise an insulating polymer. In this case, the insulating polymer may be, for example, a polymer. Here, the polymer may comprise, for example, any one of polyethylene (PE), polypropylene (PP), and polyethylene terephthalate (PET).

Also, the insulator 123 may be provided on an outer circumferential surface of the second can 122 in the form of one of tubing, wrapping, or coating.

For example, the tubing form may be a form in which the insulator 123 is provided on the outer circumferential surface of the second can 122 in the form of a tube, and the wrapping form may be a form in which the outer circumferential surface of the second can 122 is wrapped by the insulator 123. In addition, the coating form may be a form in which a coating layer is formed by applying an insulating material on the outer circumferential surface of the second can 122.

Here, the first can 121 and the second can 122 may be coupled to each other in a press-fitting manner. That is, the second can 122 provided with the insulator 123 on the outer circumferential surface thereof may be press-fitted into and coupled to an inner circumferential surface of the first can 121.

In the secondary battery 100 configured as described above according to an embodiment of the present invention, the first can 121 and the second can 122 may be assembled in the press-fitting manner to allow the first electrode 111 and the second electrode 112 to be connected to each other. Thus, the first can 121 and the second can 122 may serve as a first electrode terminal and a second electrode terminal to simplify the assembly, secure the reliability such as the sealability, and easily manufacture a large-capacity medium and large battery. Therefore, high productivity and low manufacturing costs may be realized.

When the internal pressure of the secondary battery 100 reaches a critical point or higher, the coupling of the first can 121 and the second can 122, which are coupled to each other in the press-fitting manner, may be released, and the electrode assembly 110 coupled to the first can 121 and the second can 122 may be disconnected. That is, when the internal pressure of the battery reaches the critical point or higher, the first can 121 and the second can 122 may be subjected to pressures by which the first can 121 and the second can 122 become spaced apart from each other. As a result, the first can 121 may move in one direction C1, and the second can 122 may move in the other direction C2 to release the press-fitted coupling between the first can 121 and the second can 122. Here, ends of the first electrode 111 and the second electrode 112, which directly contact the first can 121 and the second can 122, and the first can 121 or the second can 122 may become disconnected to interrupt the current. Therefore, when the internal temperature and pressure of the battery suddenly increase due to the overcharging or external short-circuit of the secondary battery 100, the coupling of the first can 121 and the second can 122, which are press-fitted into and coupled to each other, may become released to perform a safety function such as the current interruption function without an additional safety device.

Hereinafter, a secondary battery according to another embodiment will be described.

Figure 4:
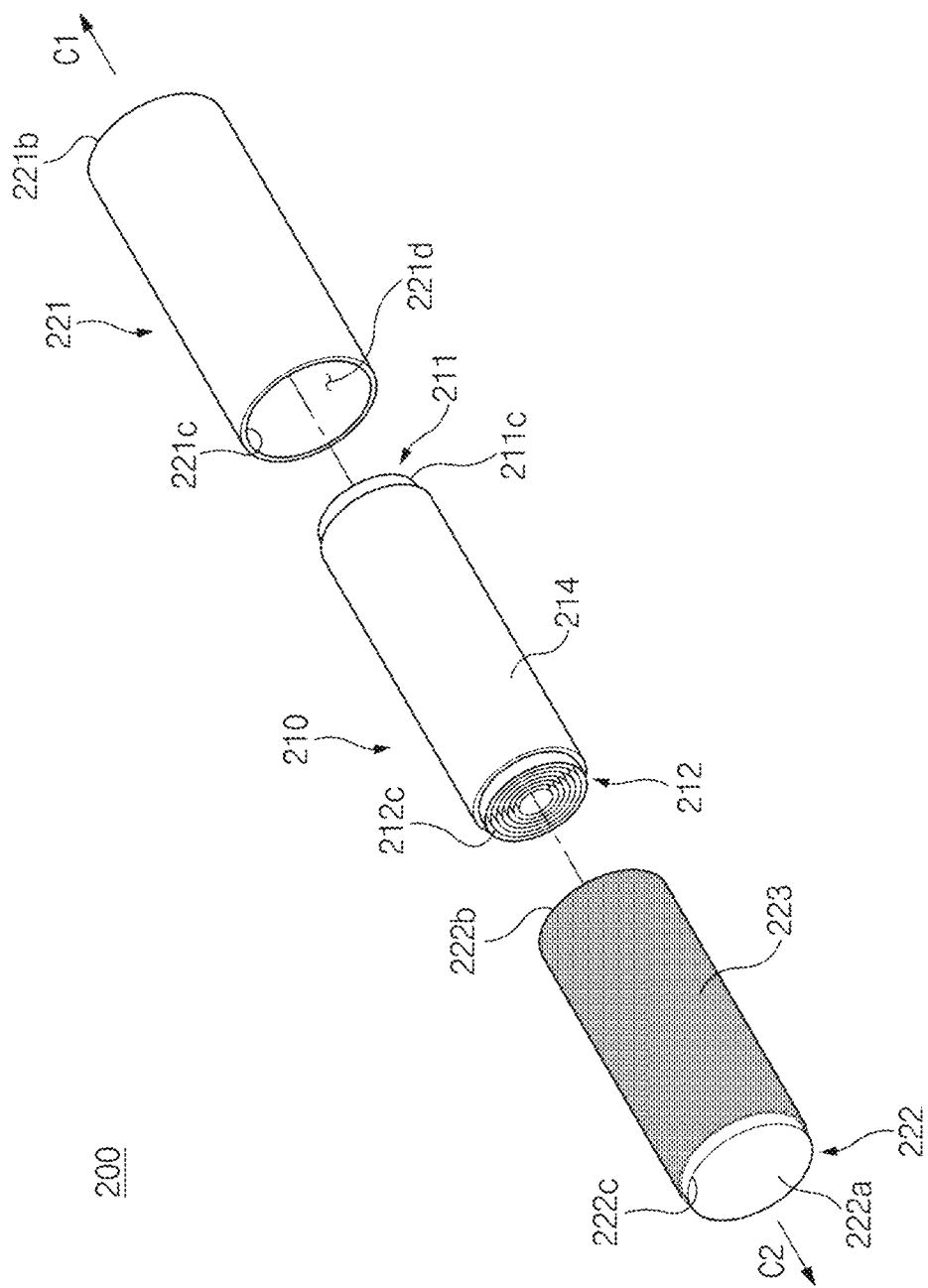
FIG. 4 is an exploded perspective view of a secondary battery according to a second embodiment of the present invention.
Figure 5:
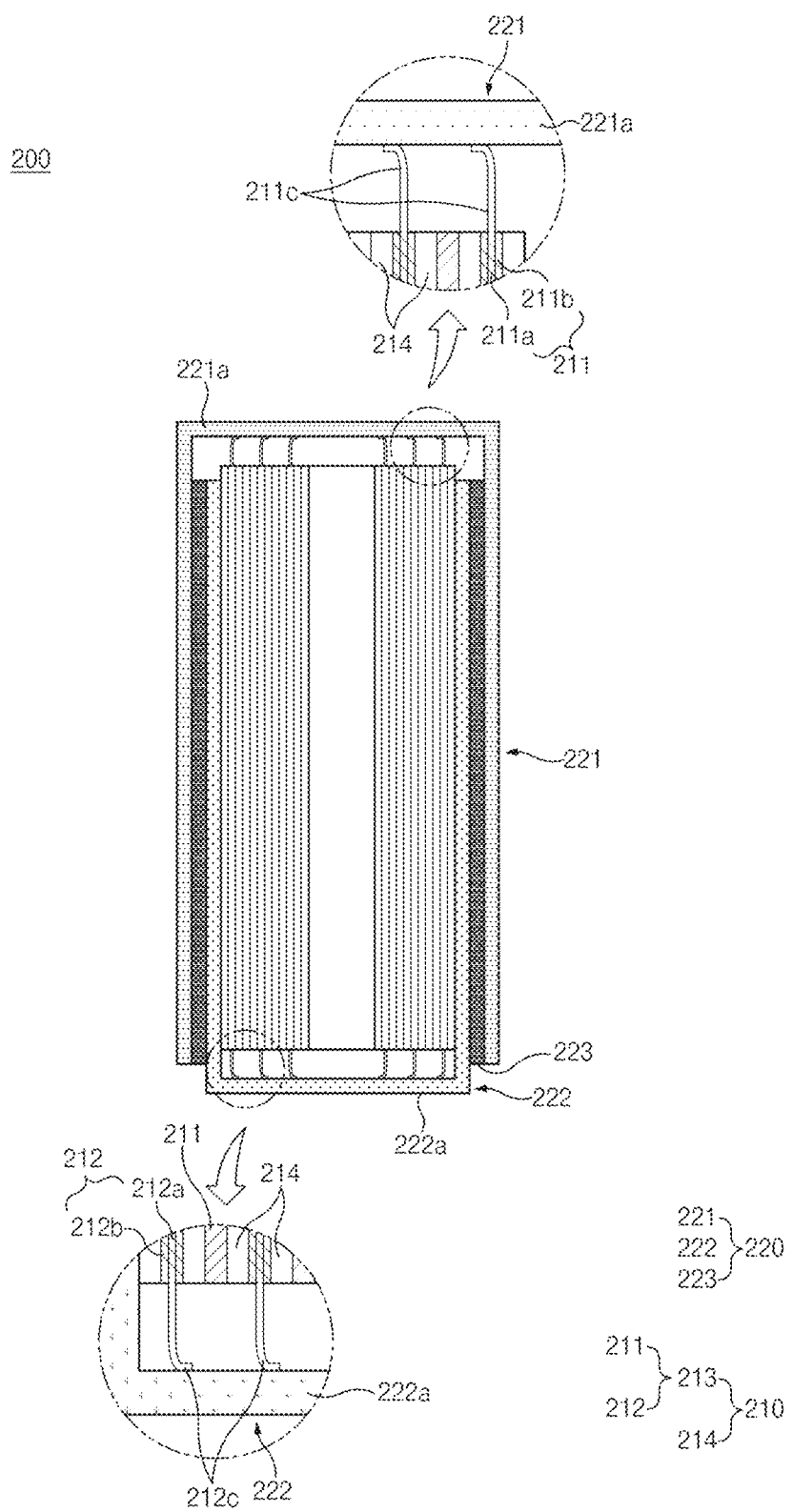
FIG. 5 is a cross-sectional view of the secondary battery according to the second embodiment of the present invention.

FIG. 4 is an exploded perspective view of a secondary battery according to another embodiment of the present invention, and FIG. 5 is a cross-sectional view of the secondary battery according to a second embodiment of the present invention.

Referring to FIG. 4, a secondary battery 200 according to another embodiment of the present invention comprises an electrode assembly 210, a can 220 comprising a first can 221 and a second can 222, which accommodate the electrode assembly 210 therein, and an insulator 223 insulating an overlapping portion between the first can 221 and the second can 222.

The secondary battery 200 according to the second embodiment of the present invention is different from the secondary battery according to the foregoing first embodiment in the materials of the first can 221 and the second can 222 and the polarities of the first electrode 211 and the second electrode 212. Thus, contents of this embodiment, which are duplicated with those according to the forgoing embodiment, will be briefly described, and also, differences therebetween will be mainly described.

In more detail, referring to FIGS. 4 and 5, in the secondary battery 200 according to the second embodiment of the present invention, the electrode assembly 210 forms a structure in which an electrode 213 and a separator 214 are alternately stacked. Here, the electrode assembly 210 may have a wound shape.

The electrode 213 may comprise the first electrode 211 and the second electrode 212.

The first electrode 211 may comprise a first electrode collector 211a and a first electrode active material 211b applied on the first electrode collector 211a. Also, the first electrode 211 may comprises a first electrode non-coating portion 211c that is not coated with the first electrode active material 211b.

The second electrode 212 may comprise a second electrode collector 212a and a second electrode active material 212b applied on the second electrode collector 212a. Also, the second electrode 212 may comprise a second electrode non-coating portion 212c that is not coated with the second electrode active material 212b.

The can 220 may be provided with an accommodation part that accommodates the electrode assembly 210 therein and comprises the first can 221 and the second can 222, which have cylindrical shapes opened in a direction facing each other.

Here, the first can 221 may be electrically connected to the first electrode 211, and the second can 222 may be electrically connected to the second electrode 212.

Also, each of the first can 221 and the second can 222 may have the cylindrical shape. The first can 221 may have an inner circumferential surface greater than an outer circumferential surface of the second can 222 so that the second can is inserted into the first can 221.

Furthermore, the first can 221 may have a first side 221b on which a first connection part 221a may be formed to be closed in a first direction C1, and the first can 221 may have a second side 221c in which a first opening 221d is formed to be opened in a second direction C2 opposite the first direction C1. The second can 222 may have a second side 222c on which a second connection part 222a is formed to be closed in the second direction C2, and the second can 222 may have a first side 222b in which a second opening (not shown) is formed to be opened in the first direction C1. Here, the first electrode 211 may have one end connected to the first connection part 221a, and the second electrode 212 may have the other end connected to the second connection part 222a. Here, for example, the first electrode non-coating portion 211c of the first electrode 211 may directly contact the first connection part 221a, and the second electrode non-coating portion 212c of the second electrode 212 may directly contact the second connection portion 222a.

For example, the first can 221 disposed at the outside may comprise steel, and the second can 222 disposed at the inside may comprise aluminum. Here, the first can 221 may be made of steel coated with nickel (Ni).

Here, the first electrode 211 may be provided as the negative electrode, and the second electrode 212 may be provided as the positive electrode.

The insulator 223 may comprise an insulating material to insulate the overlapping portion between the first can 221 and the second can 222.

<Manufacturing Example>

Figure 6:
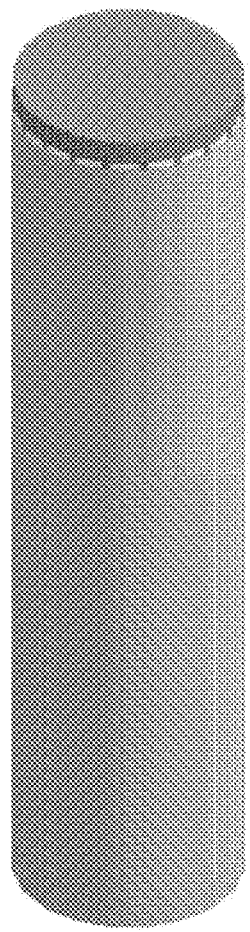
FIG. 6 is a view illustrating a temperature analysis of a can in the secondary battery according to an embodiment of the present invention.
Figure 6:
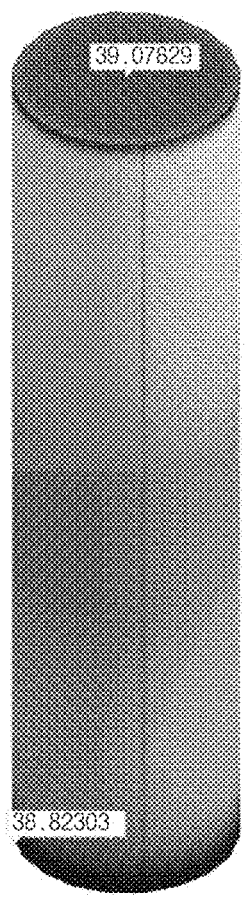

FIG. 6 is a view illustrating a temperature analysis of the can of the secondary battery according to an embodiment of the present invention.

Referring to FIG. 6(a), a can comprising a first can and a second can, which have cylindrical shapes opened in a direction facing each other, was manufactured. Here, the first can disposed at the outside was made of aluminum, and the second can disposed at the inside was made of steel. Here, the first can has a thickness of 0.2 t (t=0.1 mm), and the second can has a thickness of 0.2 t.

Also, an insulator for insulating an overlapping portion between the first can and the second can was provided. Here, the insulator was made of a polymer material and formed to have a thickness 0.1 t (t=0.1 mm).

Also, the outer can, which is the first can, was formed to have a length of 200 mm, the inner can, which is the second can, was formed to have a length of 199 mm, and the insulator was formed to have a length of 195 mm. In FIG. 6 (a), a dark gray color represents the inner can (second can), a medium gray color represents the outer can (first can), and a light gray color represents the insulator.

<Comparative Example>

Figure 7:
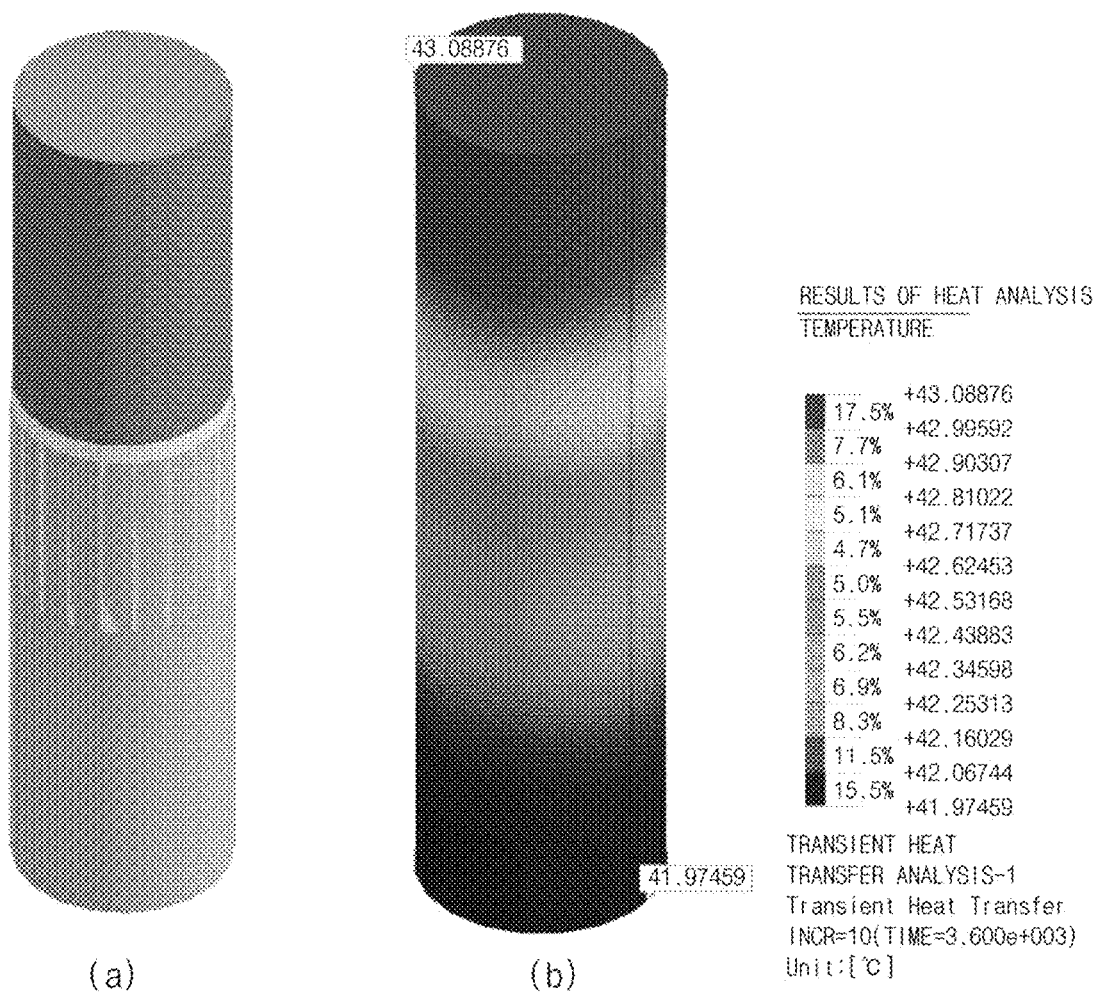
FIG. 7 is a view illustrating a temperature analysis of a can in a secondary battery according to a related art that is Comparative Example.

FIG. 7 is a view illustrating a temperature analysis of a can in a secondary battery according to a related art that is Comparative Example.

Referring to FIG. 7(a), the secondary battery was manufactured in the same method as that of Manufacturing Example except for an outer can has a length of 120 mm, an inner can has a length of 120 mm, and an insulator has a length of 50 mm. In FIG. 7 (a), a dark gray color represents the inner can, a medium gray color represents the outer can, and a light gray color represents the insulator.

<Experimental Example>

The temperature analysis was shown in FIGS. 6(b) and 7(b) by setting an initial temperature at 50° C.

Here, natural convection conditions were given only to a circumference (the medium gray color) of the outer can to compare time-varying temperatures.

As a result of the experiment, after 3,600 seconds, a maximum temperature of the can having the structure shown in Manufacturing Example was 39° C., but a maximum temperature of the can in Comparative Example was 43° C. As a result, it may be confirmed that the can structure proposed in Manufacturing Example is excellent in terms of heat dissipation characteristics.

While the present invention has been particularly shown and described with reference to exemplary embodiments thereof, it is to be understood that the scope of the present invention is not limited to the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising:
   an electrode assembly in which a first electrode, a separator, and a second electrode are alternately stacked and wound together;
   a can having an accommodation part that receives the electrode assembly therein, the can comprising a first can and a second can each having a cylindrical shape elongated along a longitudinal axis of the can, wherein the first can has a second side having a first opening that is open in a second direction along the longitudinal axis, and the first can has a first side having a first connection part that is closed in a first direction along the longitudinal axis, the first direction being opposite the second direction, wherein the second can is received within the first can so as to define an overlapping portion between the first can and the second can along the longitudinal axis, wherein a length of the overlapping portion along the longitudinal axis is greater than a diameter of each of the first can and the second can, and wherein the first opening of the first can is larger than an outer circumferential surface of the second can; and
   an insulator configured to insulate the overlapping portion between the first can and the second can,
   wherein the first can forms a first electrode terminal that directly contacts an end of the first electrode, and
   the second can forms a second electrode terminal that directly contacts an end of the second electrode.

2. The secondary battery of claim 1, wherein the insulator comprises an insulating polymer.

3. The secondary battery of claim 1, wherein the first can and the second can have shapes corresponding to each other.

4. The secondary battery of claim 1, wherein the insulator is provided on the outer circumferential surface of the second can in the form of any one of tubing, wrapping, and coating.

5. The secondary battery of claim 4, wherein the first can and the second can are coupled to each other in a press-fitting manner.

6. The secondary battery of claim 1, wherein
the second can has a first side having a second opening that is open in the first direction, and the second can has a second side having a second connection part that is closed in the second direction, and
the first electrode has a first end that is directly connected to the first connection part, and the second electrode has a second end that is directly connected to the second connection part.

7. The secondary battery of claim 4, claim 1, wherein the first can comprises aluminum, and
the second can comprises steel.

8. The secondary battery of claim 7, wherein the first electrode is a positive electrode, and the second electrode is a negative electrode.

9. The secondary battery of claim 1, wherein the first can comprises steel, and
the second can comprises aluminum.

10. The secondary battery of claim 9, wherein the first electrode is a negative electrode, and the second electrode is a positive electrode.

11. The secondary battery of claim 6, wherein a length of the electrode assembly along the longitudinal axis is greater than a length of the second can along the longitudinal axis.

12. The secondary battery of claim 6, wherein a length of the first can is 70% or more of a length of the second can along the longitudinal axis.

13. The secondary battery of claim 12, wherein the length of the overlapping portion between the first can and the second can is 70% or more of a total length of the can along the longitudinal axis, the length of the overlapping portion being less than 100% of the total length of the can.

14. The secondary battery of claim 13, wherein a length of each of the first can and the second can along the longitudinal axis is in a range of 100 mm to 250 mm,
a length of the can, which is defined by the first can and the second can coupled together, along the longitudinal axis is in a range of 100 mm to 250 mm, and
a diameter of each of the first can and the second can is in a range of 40 mm to 60 mm.

15. The secondary battery of claim 1, wherein the second can is configured to extend through the first opening of the first can.

16. The secondary battery of claim 1, wherein the second can has a first side having a second opening that is open in the first direction, and the second can has a second side having a second connection part that is closed in the second direction, and
wherein the second opening of the second can is larger than an outer circumferential surface of the electrode assembly such that the electrode assembly is received within the second can.

17. The secondary battery of claim 16, wherein the electrode assembly projects outwardly from the second can along the longitudinal axis, the electrode assembly projecting outwardly from the second can through the second opening of the second can.

18. The secondary battery of claim 15, wherein the second can projects outwardly from the first can along the longitudinal axis, the second can projecting outwardly from the first can through the first opening of the first can.

* * * * *